(12) United States Patent
Hsieh et al.

(10) Patent No.: US 10,054,765 B2
(45) Date of Patent: *Aug. 21, 2018

(54) PHOTOGRAPHING OPTICAL LENS ASSEMBLY, IMAGING DEVICE AND ELECTRONIC DEVICE

(71) Applicant: Largan Precision Co., Ltd., Taichung (TW)

(72) Inventors: Tung-Yi Hsieh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/493,128

(22) Filed: Apr. 20, 2017

(65) Prior Publication Data

US 2017/0219800 A1    Aug. 3, 2017

Related U.S. Application Data

(63) Continuation of application No. 14/616,360, filed on Feb. 6, 2015, now Pat. No. 9,667,847.

(30) Foreign Application Priority Data

Nov. 25, 2014   (TW) .............................. 103140891 A

(51) Int. Cl.
*G02B 13/00*   (2006.01)
*G02B 9/34*   (2006.01)

(52) U.S. Cl.
CPC ............. *G02B 13/004* (2013.01); *G02B 9/34* (2013.01)

(58) Field of Classification Search
CPC .. G02B 13/004; G02B 13/008; G02B 13/002; G02B 13/143; G02B 9/34
See application file for complete search history.

(56) References Cited

U.S. PATENT DOCUMENTS

| | | | | |
|---|---|---|---|---|
| 8,896,937 B1* | 11/2014 | Hsueh | ................. | G02B 13/004 359/715 |
| 9,667,847 B2* | 5/2017 | Hsieh | ................... | H04N 5/2254 |
| 2008/0266676 A1* | 10/2008 | Yasuhiko | ................. | G02B 9/34 359/708 |
| 2011/0096412 A1* | 4/2011 | Tang | ........................ | G02B 9/34 359/715 |

(Continued)

*Primary Examiner* — Bumsuk Won
*Assistant Examiner* — Jeffrey Madonna
(74) *Attorney, Agent, or Firm* — Chun-Ming Shih; HDLS IPR Services

(57) ABSTRACT

A photographing optical lens assembly includes, in order form an object side to an image side, a first lens element, a second lens element, a third lens element, and a fourth lens element. The first lens element with positive refractive power has an object-side surface being convex in a paraxial region. The second lens element has negative refractive power. The third lens element with refractive power has an object-side surface being concave in a paraxial region, and the object-side surface and an image-side surface are both aspheric. The fourth lens element with negative refractive power has an object-side surface being concave in a paraxial region, and an image-side surface being convex in a paraxial region, the object-side surface and the image-side surface are both aspheric.

20 Claims, 10 Drawing Sheets

(56) References Cited

U.S. PATENT DOCUMENTS

2012/0281299 A1* 11/2012 Hsu ................. G02B 13/004
                                                    359/715
2014/0226222 A1*  8/2014 Hsieh ............... G02B 9/34
                                                    359/781

* cited by examiner

PHOTOGRAPHING OPTICAL LENS ASSEMBLY, IMAGING DEVICE AND ELECTRONIC DEVICE

CROSS-REFERENCE TO RELATED APPLICATIONS

This application is a continuation application of U.S. application Ser. No. 14/616,360 filed on Feb. 6, 2015, which claims priority to Taiwan Application No. 103140891 filed on Nov. 25, 2014. The entire disclosure of which is incorporated by reference herein.

BACKGROUND

Technical Field

The present disclosure relates to a photographing optical lens assembly and an imaging device. More particularly, the present disclosure relates to a compact photographing optical lens assembly and imaging device applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have reduced the pixel size of image sensors and compact optical systems have gradually evolved toward the field of higher megapixels, there is an increasing demand for compact optical systems featuring better image quality.

A conventional optical system employed in a portable electronic product mainly adopts a four-element lens structure, and an image-side surface of a fourth lens element of the said four-element lens structure is mainly concave. By such arrangement, the back focal length of the optical system can be effectively educed. However, the incident angle of light projected onto the sensor cannot be easily suppressed, and makes the optical system result in worse image quality.

SUMMARY

According to one aspect of the present disclosure, a photographing optical lens assembly includes, in order from an object side to an image side, a first lens element, a second lens element, a third lens element and a fourth lens element. The fourth lens element has an object-side surface being concave in a paraxial region thereof and an image-side surface being convex in a paraxial region thereof for effectively suppressing the incident angle of light projected onto an image sensor. Additionally, in a telephoto system with narrow view angle, an axial distance between the second lens element and the third lens element can be effectively controlled, and by applying first lens element and the second lens element with stronger refractive power in this arrangement, a better light convergence can be provided.

According to one aspect of the present disclosure, a photographing optical lens assembly includes, in order from an object side to an image side, a first lens element, a second lens element, a third lens element and a fourth lens element. The first lens element with positive refractive power has an object-side surface being convex in a paraxial region thereof. The second lens element is with negative refractive power. The third lens element with refractive power has an object-side surface being concave in a paraxial region thereof, wherein the object-side surface and an image-side surface of the third lens element are aspheric. The fourth lens element with negative refractive power has an object-side surface being concave in a paraxial region and an image-surface being convex in a paraxial region, with the object-side surface and the image-side surface of the fourth lens element being aspheric. The photographing optical lens assembly has a total of four lens elements with refractive power, an axial distance between the first lens element and the second lens element is T12, an axial distance between the second lens element and the third lens element is T23, an axial distance between the third lens element and the fourth lens element is T34, and the following condition is satisfied:

$1.75 < T23/(T12+T34)$.

According to another aspect of the present disclosure, an imaging device includes the photographing optical lens assembly according to the aforementioned aspect and an image sensor, wherein the image sensor is located at the image side of the photographing optical lens assembly.

According to further another aspect of the present disclosure, an electronic device includes the imaging device according to the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
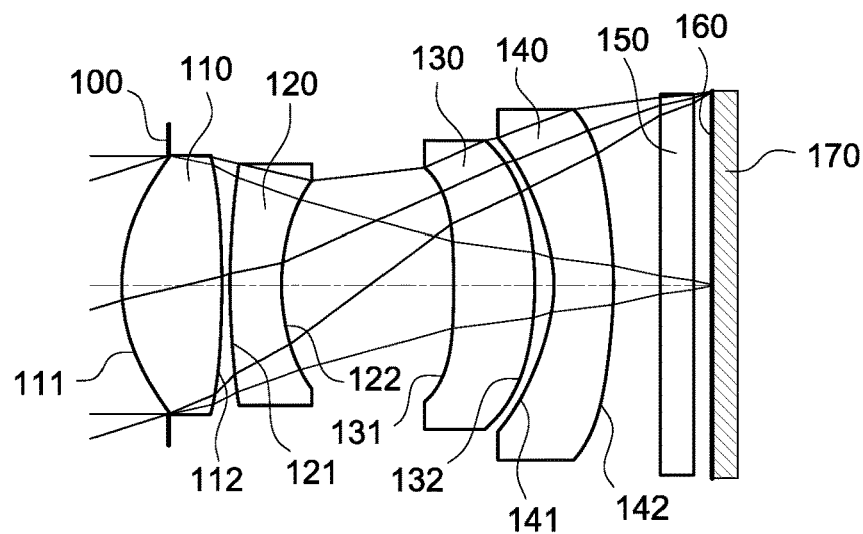
FIG. 1 is a schematic view of an imaging device according to the 1st embodiment of the present disclosure.

A photographing optical lens assembly includes, in order from an object side to an image side, a first lens element, a second lens element, a third lens element, and a fourth lens element. The photographing optical lens assembly has a total of four lens elements with refractive power.

The first lens element with positive refractive power has an object-side surface being convex in a paraxial region thereof. Therefore, the total track length can be reduced so as to maintain the compact size of the photographing optical lens assembly.

The second lens element with negative refractive power, and an object-side surface of the second lens element has at least one inflection point in an off-axis region thereof for reducing the angle of incidence on the image surface, and, therefore, correcting the off-axis aberrations.

The third lens element has an object-side surface being concave in a paraxial region thereof with the object-side surface and an image-side surface both being aspheric, and can have positive power with the image-side surface being convex in a paraxial region thereof, so that the astigmatism of the photographing optical lens assembly can be corrected.

The fourth lens element with negative refractive power has an object-side surface being concave in a paraxial region thereof and an image-side surface being convex in a paraxial region thereof, and the object-side surface and the image-side surface are both aspheric, which can effectively suppress the incident angle of light projected onto an image sensor.

When an axial distance between the first lens element and the second lens element is T12, an axial distance between second lens element and the third lens element is T23, and an axial distance between the third lens element and the fourth lens element is T34, the following condition is satisfied: $1.75<T23/(T12+T34)$. When certain relation is satisfied in a telephoto system with a well-defined view angle, the axial distance between the second lens element and the third lens element can be effectively controlled. In addition, applying first lens element and the second lens element with stronger refractive power can provide a better light convergence. Preferably, the following condition is satisfied: $2.5<T23/(T12+T34)$.

When an Abbe number of the second lens element is V2 and an Abbe number of the third lens element is V3, the following condition is satisfied: $V2+V3<55$. Therefore, the chromatic aberration of the photographing optical lens assembly can be corrected.

When a focal length of the photographing optical lens assembly is f, and a maximum image height of the photographing optical lens assembly is ImgH, the following condition is satisfied: $2.25<f/ImgH<5.0$. Therefore, a sufficient field of view can be provided. Preferably, the following condition is satisfied: $2.75<f/ImgH<5.0$.

When a curvature radius of the image-side of the fourth lens element is R7, and the focal length of the photographing optical lens assembly is f, the following condition is satisfied: $-0.40<R7/f<-0.15$. Therefore, the aberration generated form the photographing optical lens assembly can be corrected.

When the maximum image height of the photographing optical lens assembly is ImgH, and an entrance pupil diameter of the photographing optical lens assembly is EPD, the following condition is satisfied: $ImgH/EPD<1.0$. Therefore, the amount of the light entry in the photographing optical lens assembly can be effectively controlled.

When a curvature radius of an object-side of the second lens element is R3, and a curvature radius of an image-side of the second lens element is R4, the following condition is satisfied: $|R4/R3|<0.50$. Therefore, the refractive power of the second lens element is proper, so that the aberration generated from the first lens element can be corrected.

When a central thickness of the second lens element is CT2 and a central thickness of the third lens element is CT3, the following condition is satisfied: $0.8<CT2/CT3<1.5$. Therefore, it provides favorable moldability and homogeneity for the lens elements during the injecting molding process so as to increase manufacturing yield rate.

When the axial distance between the second lens element and the third element is T23, and an axial distance between the image-side surface of the fourth lens element and an image surface is BFL, the following condition is satisfied: $1.5<T23/BFL<3.0$. Therefore, the axial distance between of the second lens element and the third lens element is proper, so that the back focal length can be adjusted for reducing the total track length of the photographing optical lens assembly.

When the focal length of the photographing optical lens assembly is f, the focal length of the first lens element is f1, and the focal length of the second lens element is f2, the following condition is satisfied: $3.0<|f/f1|+|f/f2|$. Therefore, the aberration of the photographing optical lens assembly can be corrected.

When the focal length of the photographing optical lens assembly is f, an axial distance between the object-side surface of the first lens element and the image-side surface of the fourth lens element is TD, and an axial distance between the image-side surface of the fourth lens element and an image surface is BFL, the following condition is satisfied: $0.90<f/(TD+BFL)<1.25$. Therefore, the back focal length of the photographing optical lens assembly can be effectively controlled.

When the focal length of the photographing optical lens assembly is f and a curvature radius of an object-side of the first lens element is R1, the following condition is satisfied: $3.0<f/R1<4.5$. Therefore, the total track length can be reduced so as to maintain the compact size of the photographing optical lens assembly.

A curvature radius of an image-side of the fourth lens element is R8 and the focal lens of the photographing optical lens assembly is f, the following condition is satisfied:

R8/f<−0.5. Therefore, the incident light beam in the photographing optical lens assembly is converged for aberration corrections.

The photographing optical lens assembly can include an aperture stop located between an imaged object and the second lens element. Therefore, it is favorable for balancing between telecentric effect and the wide angle functionality.

The photographing optical lens assembly can be used for infrared wavelength ranging from 750 nm to 1050 nm for motion capture applications.

According to the photographing optical lens assembly of the present disclosure, the lens elements thereof can be made of glass or plastic material. When the lens elements are made of glass material, the distribution of the refractive powers of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the photographing optical lens assembly of the present disclosure, the positive refractive power or the negative refractive power of a lens element or the focal length of the lens element, that is, refers to the refractive power or the focal length in a paraxial region of the lens element.

According to the photographing optical lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an image surface of the photographing optical lens assembly, based on the corresponding image sensor, can be flat or curved. For instance, the image surface can be a curved surface being concave facing towards the object side.

According to the photographing optical lens assembly of the present disclosure, an aperture stop can be configured as a front stop or a middle stop. A front stop disposed between an imaged object and the first lens element can provide a longer distance between an exit pupil of the photographing optical lens assembly and the image surface and thereby improves the image-sensing efficiency of an image sensor. A middle stop disposed between the first lens element and the image surface is favorable for enlarging the field of view of the photographing optical lens assembly and thereby provides a wider field of view for the same.

According to the photographing optical lens assembly of the present disclosure, the photographing optical lens assembly can be optionally applied to moving focus optical systems, and is featured with good ability for aberration correction and high image quality. The photographing optical lens assembly of the present disclosure also can be applied to 3D (three-dimensional) image capturing applications, in products such as digital cameras, mobile devices, digital tablets, smart TV, internet monitoring device, game consoles with motion sensing function, driving recording systems, rear view camera systems, and wearable devices.

According to the present disclosure, an imaging device is provided. The imaging device includes the aforementioned photographing optical lens assembly and an image sensor. The image sensor is located at the image side of the photographing optical lens assembly. In the present invention, the fourth lens element of the photographing optical lens assembly has the object-side surface being concave and the image-side surface being convex, which can effectively suppress the incident angle of light projected onto an image sensor. Preferably, the imaging device can further include a barrel member, a holding member or a combination thereof.

According to the present disclosure, an electronic device is provided. The electronic device includes the aforementioned imaging device. Therefore, the image sharpness can be enhanced while the compact size of the electronic device is maintained. Preferably, the electronic device can further include but not limited to a control unit, a display, a storage unit, a random access memory unit (RAM), a read only memory unit (ROM) or a combination thereof.

According to the above description of the present disclosure, the following 1st-11th specific embodiments are provided for further explanation.

1st Embodiment

Figure 2:
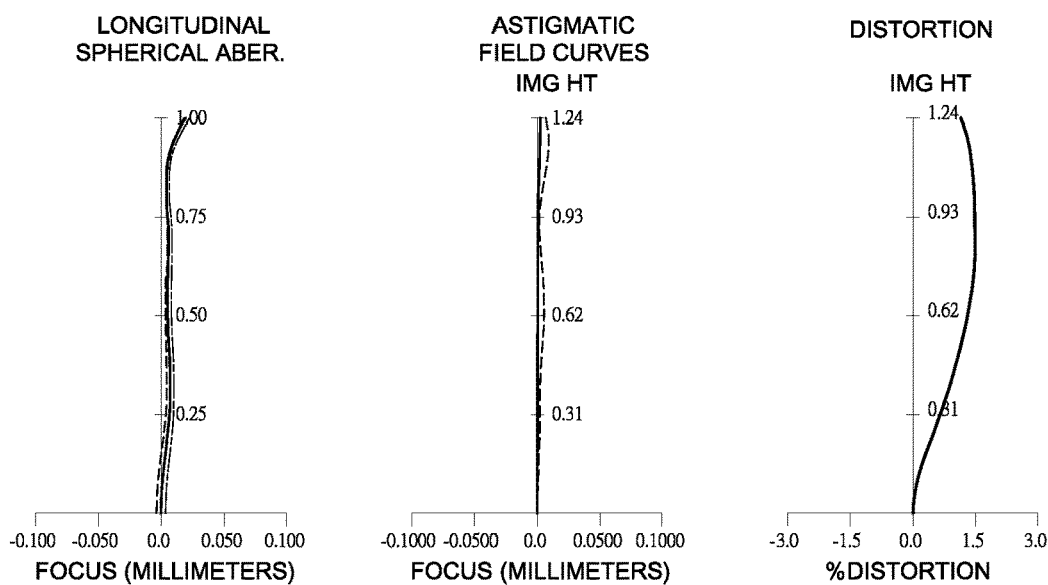
FIG. 2 shows spherical aberration curves, astigmatic field curves and a distortion curve of the imaging device according to the 1st embodiment.

FIG. 1 is a schematic view of an imaging device according to the 1st embodiment of the present disclosure. FIG. 2 shows spherical aberration curves, astigmatic field curves and a distortion curve of the imaging device according to the 1st embodiment. In FIG. 1, the imaging device includes a photographing optical lens assembly (its reference numeral is omitted) and an image sensor 170. The photographing optical lens assembly includes, in order from an object side to an image side, an aperture stop 100, a first lens element 110, a second lens element 120, a third lens element 130, a fourth lens element 140, a filter 150 and an image surface 160, wherein the image sensor 170 is located at the image surface 160 of the photographing optical lens assembly. The photographing optical lens assembly has a total of four lens elements (110-140) with refractive power, and there is an air gap in a paraxial region between any two of the first lens element 110, the second lens element 120, the third lens element 130, and the fourth lens element 140 that are adjacent to each other.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The filter 150 is made of glass material and located between the fourth lens element 140 and the image surface 160, and will not affect a focal length of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly according to the 1st embodiment, when the focal length of the photographing optical lens assembly is f, an f-number of the photographing optical lens assembly is Fno, and a half of a maximal field of view of the photographing optical lens assembly is HFOV, these parameters have the following values: f=3.84 mm; Fno=2.32; and HFOV=17.7 degrees.

In the photographing optical lens assembly according to the 1st embodiment, when an Abbe number of the second lens element 120 is V2, and an Abbe number of the third lens element 130 is V3, the following conditions is satisfied: V2+V3=43.00.

In the photographing optical lens assembly according to the 1st embodiment, when a central thickness of the second lens element 120 is CT2, and a central thickness of the third lens element 140 is CT3, the following condition is satisfied: CT2/CT3=0.64.

In the photographing optical lens assembly according to the 1st embodiment, when an axial distance between the first lens element 110 and the second lens element 120 is T12, an axial distance between the second lens element 120 and the third lens element 130 is T23, and an axial distance between the third lens element 130 and the fourth lens element 140 is T34, the following condition is satisfied: T23/(T12+T34)=6.37.

In the photographing optical lens assembly according to the 1st embodiment, when the axial distance between the second lens element 120 and the third lens element 130 is T23, and an axial distance between the image-side surface of the fourth lens element and an image surface is BFL, the following condition is satisfied: T23/BFL=1.98.

In the photographing optical lens assembly according to the 1st embodiment, when the focal length of the photographing optical lens assembly is f, an axial distance between the object-side surface of the first lens element and the image-side surface of the fourth lens element is TD, and an axial distance between the image-side surface of the fourth lens element and an image surface is BFL, and the following condition is satisfied: f/(TD+BFL)=1.03.

In the photographing optical lens assembly according to the 1st embodiment, when a curvature radius of the object-side surface 121 of the second lens element 120 is R3, and a curvature radius of the image-side surface 122 of the second lens element 120 is R4, the following condition is satisfied: |R4/R3|=0.30.

In the photographing optical lens assembly according to the 1st embodiment, when the focal length of the photographing optical lens assembly is f, and a curvature radius of an object-side surface 111 of the first lens element 110 is R1, the following condition is satisfied: f/R1=3.30.

In the photographing optical lens assembly according to the 1st embodiment, when a curvature radius of an object-side surface 141 of the fourth lens element 140 is R7, and the focal length of the photographing optical lens assembly is f, the following condition is satisfied: R7/f=−0.25.

In the photographing optical lens assembly according to the 1st embodiment, when a curvature radius of an image-side surface 142 of the fourth lens element 140 is R8, and the focal length of the photographing optical lens assembly is f, the following condition is satisfied: R8/f=−0.64.

In the photographing optical lens assembly according to the 1st embodiment, when the focal length of the photographing optical lens assembly is f, a focal length of the first lens element 110 is f1, and a focal length of the second lens element 120 is f2, the following condition is satisfied: |f/f1|+|f/f2|=3.24.

In the photographing optical lens assembly according to the 1st embodiment, when the focal length of the photographing optical lens assembly is f, and a maximum image height of the photographing optical lens assembly is ImgH, the following condition is satisfied: f/ImgH=3.10.

In the photographing optical lens assembly according to the 1st embodiment, when the maximum image height of the photographing optical lens assembly is ImgH, and an entrance pupil diameter of the photographing optical lens assembly is EPD, the following condition is satisfied: ImgH/EPD=0.75.

The detailed optical data of the 1st embodiment are shown in Table 1 and the aspheric surface data are shown in Table 2 below.

TABLE 1

1st Embodiment
f = 3.84 mm, Fno = 2.32, HFOV = 17.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.302 | | | | |
| 2 | Lens 1 | 1.163 | ASP | 0.644 | Plastic | 1.514 | 56.8 | 1.95 |
| 3 | | −5.934 | ASP | 0.050 | | | | |
| 4 | Lens 2 | 4.359 | ASP | 0.331 | Plastic | 1.650 | 21.5 | −3.01 |
| 5 | | 1.310 | ASP | 1.102 | | | | |
| 6 | Lens 3 | −6.264 | ASP | 0.521 | Plastic | 1.650 | 21.5 | 5.05 |
| 7 | | −2.224 | ASP | 0.123 | | | | |
| 8 | Lens 4 | −0.960 | ASP | 0.382 | Plastic | 1.514 | 56.8 | −3.35 |
| 9 | | −2.466 | ASP | 0.300 | | | | |
| 10 | Filter | Plano | | 0.210 | Glass | 1.517 | 64.2 | — |
| 11 | | Plano | | 0.119 | | | | |
| 12 | Image | Plano | | — | | | | |

Note:
Reference wavelength is 587.6 nm (d-line)

TABLE 2

Aspheric Coefficients

| | Surface # | | | |
|---|---|---|---|---|
| | 2 | 3 | 4 | 5 |
| k = | −2.3528E+00 | 1.8897E+01 | −5.0000E+01 | −4.4938E−01 |
| A4 = | 1.6123E−01 | −3.9801E−03 | −4.6769E−02 | −5.0144E−02 |
| A6 = | 2.1175E−04 | 1.8424E−01 | 2.5042E−01 | 1.0705E−01 |
| A8 = | −1.8619E−01 | −6.5510E−01 | −4.6205E−01 | 1.8165E+00 |
| A10 = | 3.4044E−01 | 1.0589E+00 | 4.1566E−01 | −8.4125E+00 |
| A12 = | −2.3688E−01 | −1.1615E+00 | −6.4786E−02 | 1.8990E+01 |
| A14 = | −1.0394E−01 | 5.1454E−01 | 1.4934E−02 | −1.5029E+01 |

| | Surface # | | | |
|---|---|---|---|---|
| | 6 | 7 | 8 | 9 |
| k = | 1.6167E+01 | 9.2113E−01 | −1.7795E−01 | −4.8785E+01 |
| A4 = | −2.8189E−01 | −1.1466E−01 | 6.1855E−01 | 8.3284E−02 |
| A6 = | −2.7193E−02 | 6.2295E−01 | −5.1667E−01 | −3.8602E−01 |
| A8 = | −4.0635E−01 | −2.8704E+00 | −8.5501E−01 | 4.2455E−01 |
| A10 = | −1.0824E−01 | 5.4758E+00 | 3.6480E+00 | −2.1659E−01 |
| A12 = | −3.8909E−01 | −5.3546E+00 | −4.3942E+00 | 1.8336E−02 |
| A14 = | 7.9982E−01 | 2.1319E+00 | 1.8837E+00 | 9.4135E−03 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
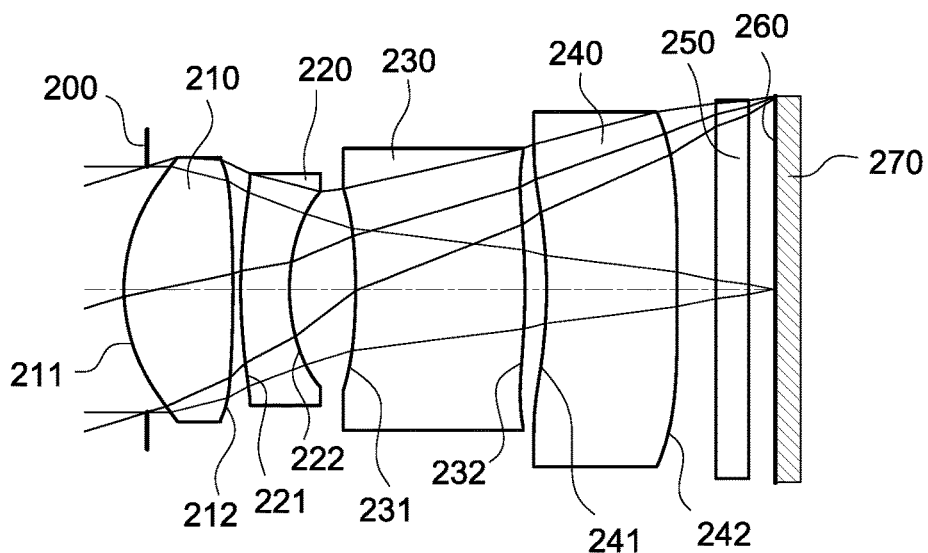
FIG. 3 is a schematic view of an imaging device according to the 2nd embodiment of the present disclosure.
Figure 4:
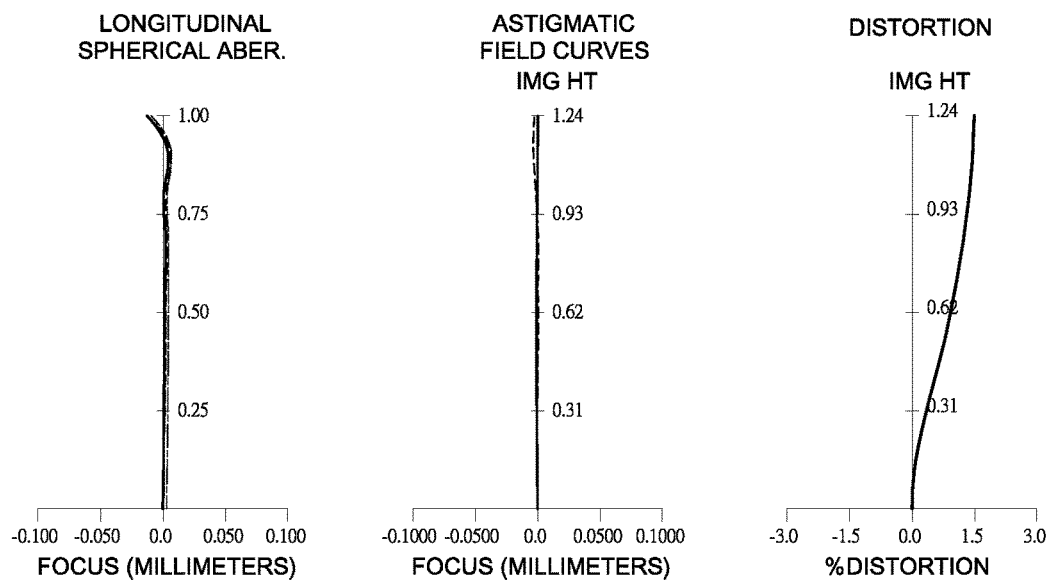
FIG. 4 shows, in order from left to right, spherical aberration curves, astigmatic field curves and a distortion curve of the imaging device according to the 2nd embodiment.

FIG. 3 is a schematic view of an imaging device according to the 2nd embodiment of the present disclosure. FIG. 4 shows, in order from left to right, spherical aberration curves, astigmatic field curves and a distortion curve of the imaging device according to the 2nd embodiment. In FIG. 3, the imaging device includes a photographing optical lens assembly (its reference numeral is omitted) and an image sensor 270. The photographing optical lens assembly includes, in order from an object side to an image side, an aperture stop 200, a first lens element 210, a second lens element 220, a third lens element 230, a fourth lens element 240, a filter 250 and an image surface 260, wherein the image sensor 270 is located at the image surface 260 of the photographing optical lens assembly. The photographing optical lens assembly has a total of four lens elements (210-240) with refractive power, and there is an air gap in a paraxial region between any two of the first lens element 210, the second lens element 220, the third lens element 230, and the fourth lens element 240 that are adjacent to each other.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. Moreover, the object-side surface 221 of the second lens element 220 has at least one inflection point in an off-axis region thereof.

The third lens element 230 with negative refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The filter 250 is made of glass material and located between the fourth lens element 240 and the image surface 260, and will not affect a focal length of the photographing optical lens assembly.

The detailed optical data of the 2nd embodiment are shown in Table 3 and the aspheric surface data are shown in Table 4 below.

TABLE 3

2nd Embodiment
$f = 3.95$ mm, Fno = 2.50, HFOV = 17.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.149 | | | | |
| 2 | Lens 1 | 1.142 | ASP | 0.701 | Plastic | 1.544 | 55.9 | 1.90 |
| 3 | | −8.727 | ASP | 0.050 | | | | |
| 4 | Lens 2 | 3.342 | ASP | 0.313 | Plastic | 1.639 | 23.5 | −3.13 |
| 5 | | 1.205 | ASP | 0.425 | | | | |
| 6 | Lens 3 | −3.878 | ASP | 1.089 | Plastic | 1.639 | 23.5 | −131.85 |
| 7 | | −4.511 | ASP | 0.139 | | | | |
| 8 | Lens 4 | −3.238 | ASP | 0.839 | Plastic | 1.583 | 30.2 | −5.85 |
| 9 | | −68.759 | ASP | 0.250 | | | | |
| 10 | Filter | Plano | | 0.210 | Glass | 1.517 | 64.2 | — |
| 11 | | Plano | | 0.171 | | | | |
| 12 | Image | Plano | | — | | | | |

Note:
Reference wavelength is 587.6 nm (d-line)

TABLE 4

Aspheric Coefficients

| | Surface # | | | |
|---|---|---|---|---|
| | 2 | 3 | 4 | 5 |
| k = | −2.4295E+00 | 2.2251E+01 | −2.5190E+01 | −3.1796E−01 |
| A4 = | 1.9019E−01 | −4.7225E−03 | −4.2018E−02 | −6.8729E−02 |
| A6 = | −1.6829E−02 | 2.5016E−02 | −3.7600E−03 | 2.4235E−01 |
| A8 = | −1.1060E−01 | 1.6666E−01 | 1.3782E+00 | 1.9957E+00 |
| A10 = | 2.0033E−01 | −8.0387E−01 | −4.8732E+00 | −7.7718E+00 |
| A12 = | 1.0399E−02 | 4.2018E−01 | 6.9750E+00 | 2.1443E+01 |
| A14 = | −3.0274E−01 | 3.6657E−02 | −4.3913E+00 | −2.2285E+01 |

| | Surface # | | | |
|---|---|---|---|---|
| | 6 | 7 | 8 | 9 |
| k = | 1.7727E+00 | 2.1060E+01 | −3.0250E+01 | −5.0000E+01 |
| A4 = | −1.0438E−01 | 1.2414E−01 | −4.2198E−02 | −6.7034E−03 |
| A6 = | −2.5642E−01 | −2.1050E−01 | −2.9854E−01 | −2.2588E−01 |
| A8 = | 2.0929E+00 | 8.5779E−01 | 1.2212E+00 | 3.7626E−01 |
| A10 = | −9.8990E+00 | −1.1464E+00 | −1.8241E+00 | −3.4953E−01 |
| A12 = | 2.4639E+01 | 1.0898E+00 | 1.6359E+00 | 1.7082E−01 |
| A14 = | −2.4691E+01 | −5.4740E−01 | −6.8817E−01 | −3.4359E−02 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f (mm) | 3.95 | |R4/R3| | 0.36 |
| Fno | 2.50 | f/R1 | 3.46 |
| HFOV [deg.] | 17.2 | R7/f | −0.82 |
| V2 + V3 | 43.00 | R8/f | −17.41 |
| CT2/CT3 | 0.29 | |f/f1| + |f/f2| | 3.34 |
| T23/(T12 + T34) | 2.25 | f/ImgH | 3.19 |
| T23/BFL | 0.76 | ImgH/EPD | 0.78 |
| f/(TD + BFL) | 0.96 | | |

3rd Embodiment

Figure 5:
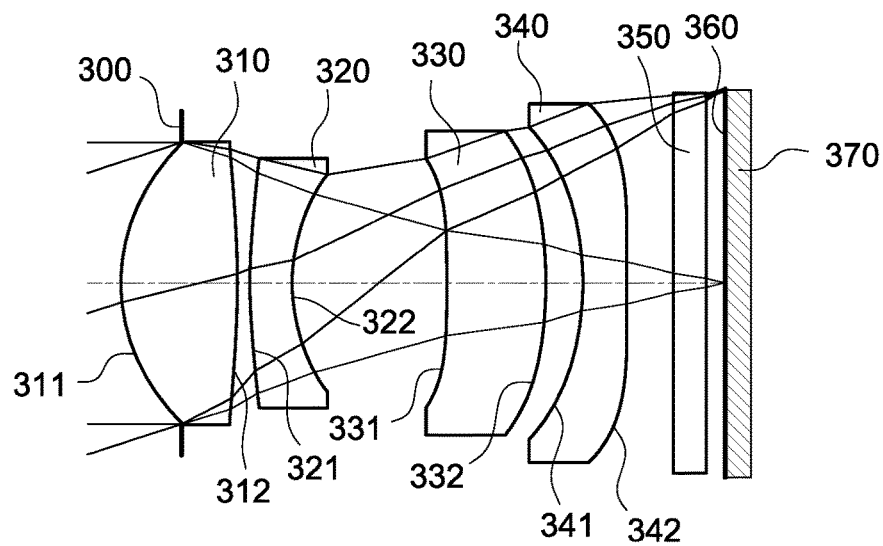
FIG. 5 is a schematic view of an imaging device according to the 3rd embodiment of the present disclosure.
Figure 6:
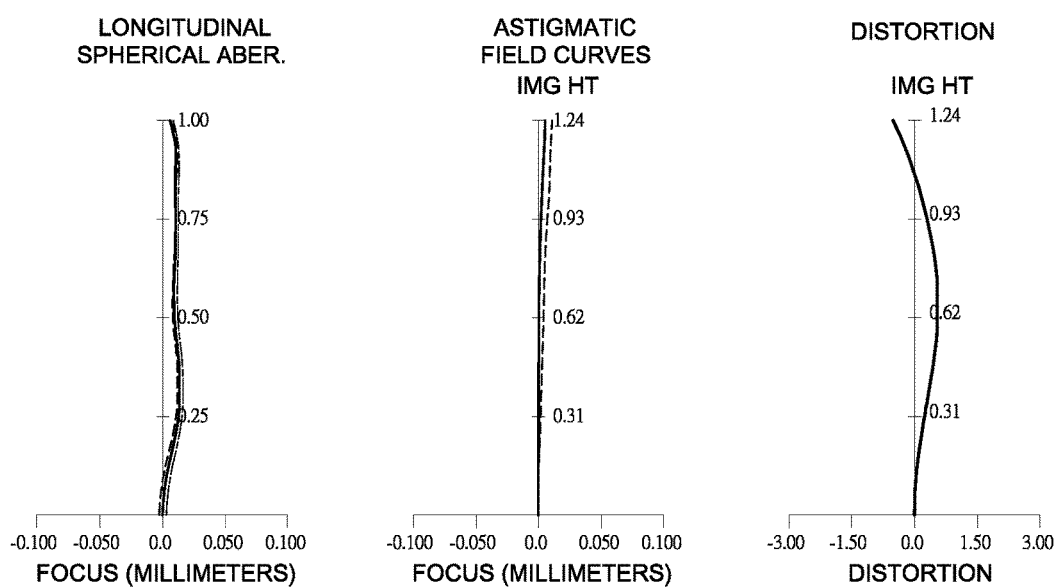
FIG. 6 shows, in order from left to right, spherical aberration curves, astigmatic field curves and a distortion curve of the imaging device according to the 3rd embodiment.

FIG. 5 is a schematic view of an imaging device according to the 3rd embodiment of the present disclosure. FIG. 6 shows, in order from left to right, spherical aberration curves, astigmatic field curves and a distortion curve of the imaging device according to the 3rd embodiment. In FIG. 5, the imaging device includes a photographing optical lens assembly (its reference numeral is omitted) and an image sensor 370. The photographing optical lens assembly includes, in order from an object side to an image side, an aperture stop 300, a first lens element 310, a second lens element 320, a third lens element 330, a fourth lens element 340, a filter 350 and an image surface 360, wherein the image sensor 370 is located at the image surface 360 of the photographing optical lens assembly. The photographing optical lens assembly has a total of four lens elements (310-340) with refractive power, and there is an air gap in a paraxial region between any two of the first lens element 310, the second lens element 320, the third lens element 330, and the fourth lens element 340 that are adjacent to each other.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. Moreover, the object-side surface 321 of the second lens element 320 has at least one inflection point in an off-axis region thereof.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The filter 350 is made of glass material and located between the fourth lens element 340 and the image surface 360, and will not affect a focal length of the photographing optical lens assembly.

The detailed optical data of the 3rd embodiment are shown in Table 5 and the aspheric surface data are shown in Table 6 below.

TABLE 5

3rd Embodiment
f = 3.83 mm, Fno = 2.12, HFOV = 18.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.387 | | | | |
| 2 | Lens 1 | 1.193 | ASP | 0.745 | Plastic | 1.514 | 56.8 | 1.98 |
| 3 | | −5.456 | ASP | 0.078 | | | | |
| 4 | Lens 2 | 3.171 | ASP | 0.270 | Plastic | 1.650 | 21.5 | −2.71 |
| 5 | | 1.095 | ASP | 0.994 | | | | |
| 6 | Lens 3 | −10.422 | ASP | 0.632 | Plastic | 1.650 | 21.5 | 5.54 |
| 7 | | −2.741 | ASP | 0.237 | | | | |
| 8 | Lens 4 | −1.708 | ASP | 0.280 | Plastic | 1.514 | 56.8 | −3.39 |
| 9 | | −100.000 | ASP | 0.300 | | | | |
| 10 | Filter | Plano | | 0.210 | Glass | 1.517 | 64.2 | — |
| 11 | | Plano | | 0.122 | | | | |
| 12 | Image | Plano | | — | | | | |

Note:
Reference wavelength is 587.6 nm (d-line)

TABLE 6

Aspheric Coefficients

| Surface # | | | | |
|---|---|---|---|---|
| | 2 | 3 | 4 | 5 |
| k = | −2.4145E+00 | −8.5216E+00 | −4.6303E+01 | −1.8036E+00 |
| A4 = | 1.6252E−01 | 1.7049E−02 | −8.6761E−02 | −1.3472E−01 |
| A6 = | 1.9596E−02 | 1.9898E−01 | 2.5866E−01 | 3.3470E−01 |
| A8 = | −1.5353E−01 | −6.5993E−01 | −4.6286E−01 | 1.5782E+00 |
| A10 = | 3.1381E−01 | 1.1023E+00 | 3.9794E−01 | −8.2055E+00 |
| A12 = | −2.5702E−01 | −1.0246E+00 | 9.0985E−02 | 1.7371E+01 |
| A14 = | 6.4895E−02 | 3.8561E−01 | −2.5881E−01 | −1.2467E+01 |

| Surface # | | | | |
|---|---|---|---|---|
| | 6 | 7 | 8 | 9 |
| k = | −1.2483E+00 | 2.6979E+00 | 8.6700E−01 | −5.0000E+01 |
| A4 = | −1.4866E−01 | 6.3409E−02 | 3.1216E−01 | 7.6957E−02 |
| A6 = | −6.2521E−02 | −2.5970E−01 | −9.6284E−01 | −6.6091E−01 |
| A8 = | −7.2059E−01 | −2.3611E−01 | 9.0290E−01 | 9.4518E−01 |
| A10 = | 2.4124E+00 | 1.2789E+00 | 4.8141E−01 | −6.9735E−01 |
| A12 = | −4.0077E+00 | −1.5191E+00 | −1.2385E+00 | 2.5530E−01 |
| A14 = | 2.4866E+00 | 6.0842E−01 | 5.2527E−01 | −3.9932E−02 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f (mm) | 3.83 | |R4/R3| | 0.35 |
| Fno | 2.12 | f/R1 | 3.21 |
| HFOV [deg.] | 18.0 | R7/f | −0.45 |
| V2 + V3 | 43.00 | R8/f | −26.11 |
| CT2/CT3 | 0.43 | |f/f1| + |f/f2| | 3.35 |
| T23/(T12 + T34) | 3.16 | f/ImgH | 3.09 |
| T23/BFL | 1.77 | ImgH/EPD | 0.69 |
| f/(TD + BFL) | 1.01 | | |

4th Embodiment

Figure 7:
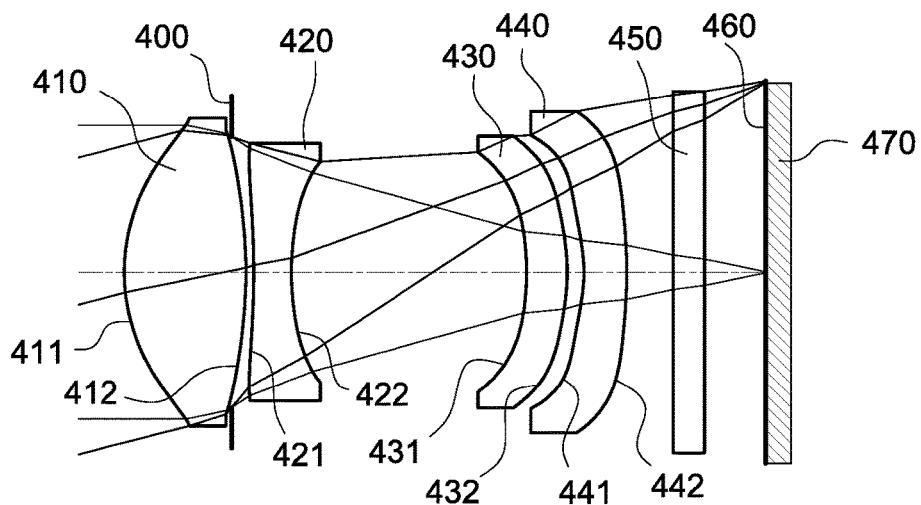
FIG. 7 is a schematic view of an imaging device according to the 4th embodiment of the present disclosure.
Figure 8:
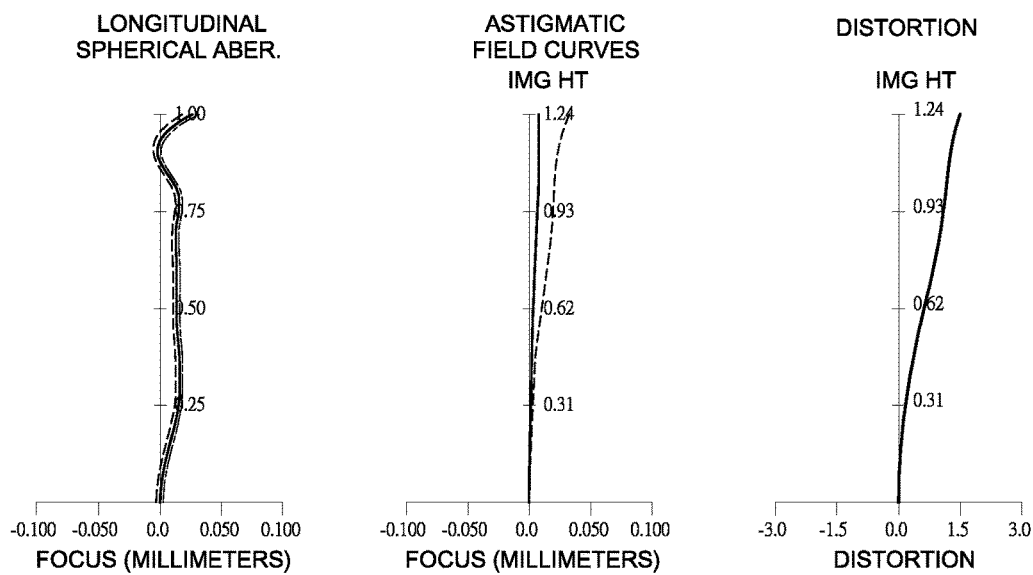
FIG. 8 shows, in order from left to right, spherical aberration curves, astigmatic field curves and a distortion curve of the imaging device according to the 4th embodiment.

FIG. 7 is a schematic view of an imaging device according to the 4th embodiment of the present disclosure. FIG. 8 shows, in order from left to right, spherical aberration curves, astigmatic field curves and a distortion curve of the imaging device according to the 4th embodiment. In FIG. 7, the imaging device includes a photographing optical lens assembly (its reference numeral is omitted) and an image sensor 470. The photographing optical lens assembly includes, in order from an object side to an image side, a first lens element 410, an aperture stop 400, a second lens element 420, a third lens element 430, a fourth lens element 440, a filter 450 and an image surface 460, wherein the image sensor 470 is located at the image surface 460 of the photographing optical lens assembly. The photographing optical lens assembly has a total of four lens elements (410-440) with refractive power, and there is an air gap in a paraxial region between any two of the first lens element 410, the second lens element 420, the third lens element 430, and the fourth lens element 440 that are adjacent to each other.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric. Moreover, the object-side surface 421 of the second lens element 420 has at least one inflection point in an off-axis region thereof.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The filter 450 is made of glass material and located between the fourth lens element 450 and the image surface 460, and will not affect a focal length of the photographing optical lens assembly.

The detailed optical data of the 4th embodiment are shown in Table 7 and the aspheric surface data are shown in Table 8 below.

TABLE 7

4th Embodiment
f = 4.63 mm, Fno = 2.45, HFOV = 14.5 deg.

| Surface # | | Curvature Radius | | Thickness | Material | Index | Abbe # | Focal Length |
|---|---|---|---|---|---|---|---|---|
| 0 | Object | Plano | | 500 | | | | |
| 1 | Lens 1 | 1.226 | ASP | 0.792 | Plastic | 1.528 | 55.7 | 1.76 |
| 2 | | −2.983 | ASP | −0.094 | | | | |
| 3 | Ape. Stop | Plano | | 0.144 | | | | |
| 4 | Lens 2 | −5.773 | ASP | 0.245 | Plastic | 1.621 | 23.5 | −2.28 |
| 5 | | 1.909 | ASP | 1.534 | | | | |
| 6 | Lens 3 | −1.935 | ASP | 0.264 | Plastic | 1.621 | 23.5 | 6.43 |
| 7 | | −1.371 | ASP | 0.108 | | | | |
| 8 | Lens 4 | −1.032 | ASP | 0.280 | Plastic | 1.537 | 55.9 | −3.21 |
| 9 | | −2.814 | ASP | 0.300 | | | | |
| 10 | Filter | Plano | | 0.210 | Glass | 1.510 | 64.2 | — |
| 11 | | Plano | | 0.397 | | | | |
| 12 | Image | Plano | | — | | | | |

Note:
Reference wavelength is 820 nm
Effective radius of Surface 3 is 0.884 mm

TABLE 8

Aspheric Coefficients

| | Surface # | | | |
|---|---|---|---|---|
| | 1 | 2 | 4 | 5 |
| k = | −2.5966E+00 | −9.5597E+00 | −2.7666E+00 | 4.6687E−01 |
| A4 = | 1.5492E−01 | 5.4362E−03 | −5.3978E−03 | 3.8160E−02 |
| A6 = | 2.4771E−03 | 1.8445E−01 | 2.3117E−01 | −1.3371E−01 |
| A8 = | −1.2269E−01 | −7.9785E−01 | −3.5751E−01 | 2.5251E+00 |
| A10 = | 1.9472E−01 | 1.5064E+00 | 2.3256E−01 | −8.6018E+00 |
| A12 = | −1.3417E−01 | −1.4618E+00 | 2.2943E−01 | 1.4716E+01 |
| A14 = | −6.9573E−03 | 5.4389E−01 | −2.5071E−01 | −9.2552E+00 |

| | Surface # | | | |
|---|---|---|---|---|
| | 6 | 7 | 8 | 9 |
| k = | −7.3951E−02 | −1.1086E+01 | 4.9691E−02 | −1.1926E+00 |
| A4 = | −2.2810E−01 | 2.8265E−02 | 1.3334E+00 | 2.9096E−01 |
| A6 = | −5.8678E−01 | 3.1954E−01 | −1.7078E+00 | −6.0678E−01 |
| A8 = | 1.6355E+00 | −3.2852E+00 | −5.0566E−01 | 3.4988E−01 |
| A10 = | −3.3696E+00 | 5.7597E+00 | 3.4640E+00 | −1.5106E−01 |
| A12 = | 2.1236E+00 | −5.0493E+00 | −4.4868E+00 | 3.4182E−02 |
| A14 = | 5.1696E−01 | 1.9943E+00 | 2.1571E+00 | −2.4459E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f (mm) | 4.63 | |R4/R3| | 0.33 |
| Fno | 2.45 | f/R1 | 3.78 |
| HFOV [deg.] | 14.5 | R7/f | −0.22 |
| V2 + V3 | 47.00 | R8/f | −0.61 |
| CT2/CT3 | 0.93 | |f/f1| + |f/f2| | 4.66 |
| T23/(T12 + T34) | 9.71 | f/ImgH | 3.73 |

-continued

| 4th Embodiment | | | |
|---|---|---|---|
| T23/BFL | 1.83 | ImgH/EPD | 0.66 |
| f/(TD + BFL) | 1.13 | | |

5th Embodiment

Figure 9:
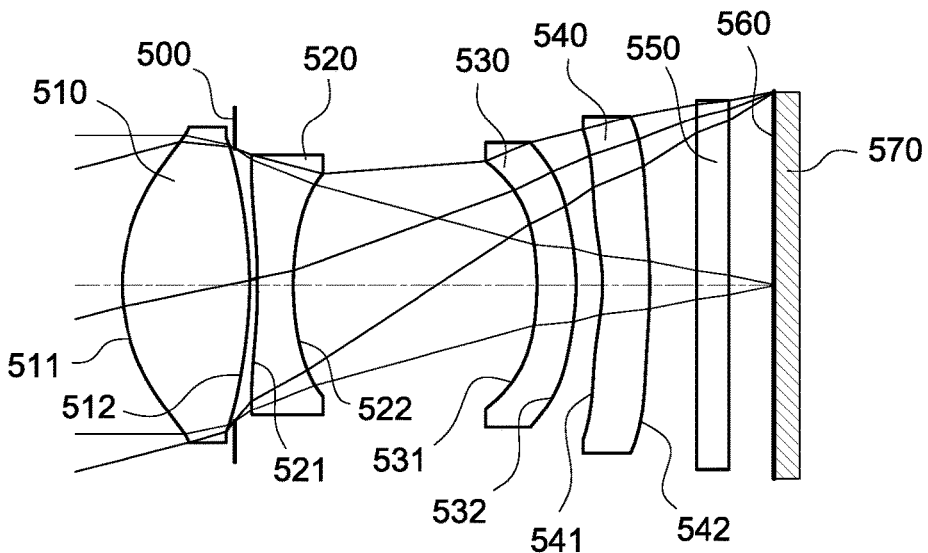
FIG. 9 is a schematic view of an imaging device according to the 5th embodiment of the present disclosure.
Figure 10:
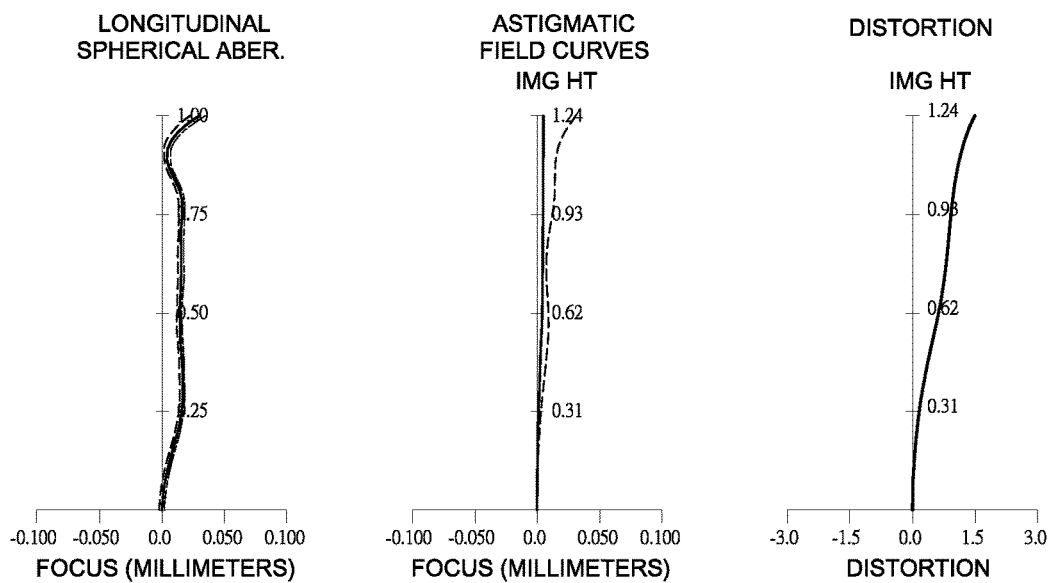
FIG. 10 shows, in order from left to right, spherical aberration curves, astigmatic field curves and a distortion curve of the imaging device according to the 5th embodiment.

FIG. 9 is a schematic view of an imaging device according to the 5th embodiment of the present disclosure. FIG. 10 shows, in order from left to right, spherical aberration curves, astigmatic field curves and a distortion curve of the imaging device according to the 5th embodiment. In FIG. 9, the imaging device includes a photographing optical lens assembly (its reference numeral is omitted) and an image sensor 570. The photographing optical lens assembly includes, in order from an object side to an image side, a first lens element 510, an aperture stop 500, a second lens element 520, a third lens element 530, a fourth lens element 540, a filter 550 and an image surface 560, wherein the image sensor 570 is located at the image surface 560 of the photographing optical lens assembly. The photographing optical lens assembly has a total of four lens elements (510-540) with refractive power, and there is an air gap in a paraxial region between any two of the first lens element 510, the second lens element 520, the third lens element 530, and the fourth lens element 540 that are adjacent to each other.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric. Moreover, the object-side surface 521 of the second lens element 520 has at least one inflection point in an off-axis region thereof.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The filter 550 is made of glass material and located between the fourth lens element 540 and the image surface 560, and will not affect a focal length of the photographing optical lens assembly.

The detailed optical data of the 5th embodiment are shown in Table 9 and the aspheric surface data are shown in Table 10 below.

TABLE 9

5th Embodiment
f = 4.63 mm, Fno = 2.45, HFOV = 14.5 deg.

| Surface # | | Curvature Radius | | Thickness | Material | Index | Abbe # | Focal Length |
|---|---|---|---|---|---|---|---|---|
| 0 | Object | Plano | | 500 | | | | |
| 1 | Lens 1 | 1.216 | ASP | 0.818 | Plastic | 1.528 | 55.7 | 1.70 |
| 2 | | −2.647 | ASP | −0.094 | | | | |
| 3 | Ape. Stop | Plano | | 0.144 | | | | |
| 4 | Lens 2 | −4.187 | ASP | 0.230 | Plastic | 1.621 | 23.5 | −2.11 |
| 5 | | 1.950 | ASP | 1.564 | | | | |
| 6 | Lens 3 | −2.000 | ASP | 0.250 | Plastic | 1.621 | 23.5 | 10.78 |
| 7 | | −1.614 | ASP | 0.169 | | | | |
| 8 | Lens 4 | −1.168 | ASP | 0.303 | Plastic | 1.537 | 55.9 | −3.96 |
| 9 | | −2.826 | ASP | 0.300 | | | | |
| 10 | Filter | Plano | | 0.210 | Glass | 1.510 | 64.2 | — |
| 11 | | Plano | | 0.289 | | | | |
| 12 | Image | Plano | | — | | | | |

Note:
Reference wavelength is 820 nm
Effective radius of Surface 3 is 0.875 mm

TABLE 10

Aspheric Coefficients

| Surface # | 1 | 2 | 4 | 5 |
|---|---|---|---|---|
| k = | −2.5527E+00 | −9.4519E+00 | −1.6221E+01 | 1.1588E+00 |
| A4 = | 1.5690E−01 | −3.2202E−02 | −5.3186E−02 | 3.3235E−02 |
| A6 = | −1.9574E−03 | 4.1278E−01 | 6.0570E−01 | −3.3824E−02 |
| A8 = | −1.2157E−01 | −1.2420E+00 | −1.2281E+00 | 2.8216E+00 |
| A10 = | 2.3247E−01 | 1.7345E+00 | 7.9610E−01 | −1.1600E+01 |
| A12 = | −1.9964E−01 | −1.2743E+00 | 6.9729E−01 | 2.1676E+01 |
| A14 = | 2.1385E−02 | 3.7837E−01 | −7.6602E−01 | −1.4256E+01 |

| Surface # | 6 | 7 | 8 | 9 |
|---|---|---|---|---|
| k = | 1.2330E−01 | −1.8503E+01 | 1.5259E−02 | −1.1926E+00 |
| A4 = | −3.4617E−01 | −2.6799E−01 | 1.3123E+00 | 4.6841E−01 |
| A6 = | −1.4592E−01 | 1.4534E+00 | −1.6030E+00 | −7.4439E−01 |
| A8 = | 2.0264E+00 | −4.8753E+00 | 5.0132E−01 | 5.3830E−01 |
| A10 = | −9.3153E+00 | 6.5188E+00 | 8.1525E−01 | −2.1704E−01 |
| A12 = | 1.3780E+01 | −4.1532E+00 | −8.5878E−01 | 4.2334E−02 |
| A14 = | −6.2103E+00 | 1.1507E+00 | 2.7569E−01 | −2.6762E−03 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f (mm) | 4.63 | |R4/R3| | 0.47 |
| Fno | 2.45 | f/R1 | 3.81 |
| HFOV [deg.] | 14.5 | R7/f | −0.25 |
| V2 + V3 | 47.00 | R8/f | −0.61 |
| CT2/CT3 | 0.92 | |f/f1| + |f/f2| | 4.92 |
| T23/(T12 + T34) | 7.14 | f/ImgH | 3.73 |
| T23/BFL | 2.15 | ImgH/EPD | 0.66 |
| f/(TD + BFL) | 1.12 | | |

6th Embodiment

Figure 11:
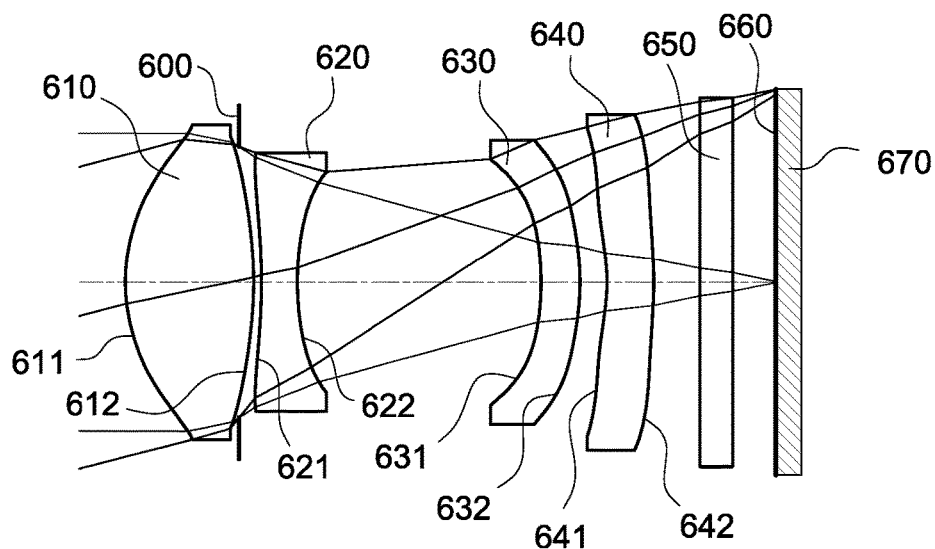
FIG. 11 is a schematic view of an imaging device according to the 6th embodiment of the present disclosure.
Figure 12:
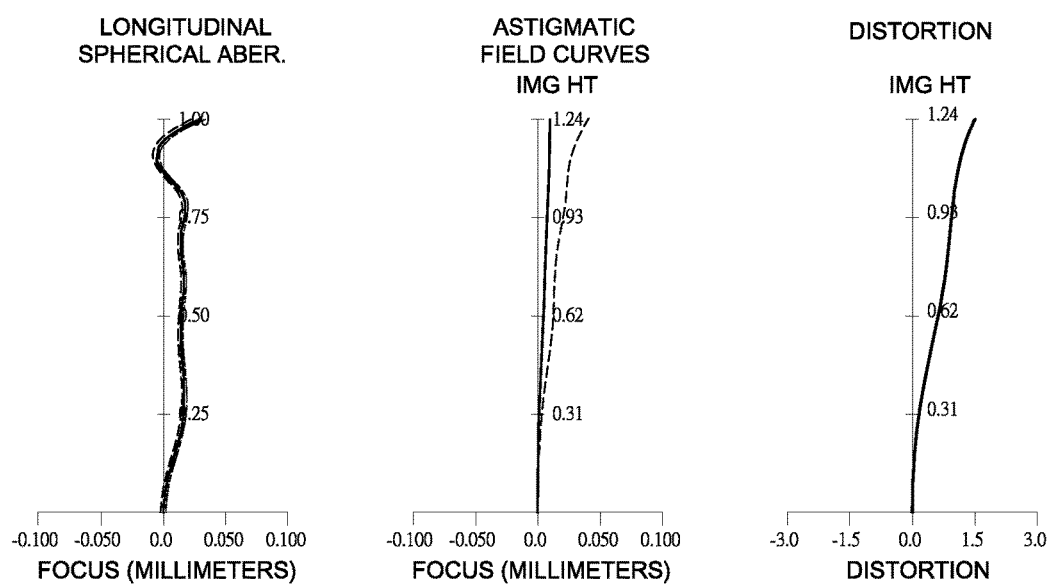
FIG. 12 shows, in order from left to right, spherical aberration curves, astigmatic field curves and a distortion curve of the imaging device according to the 6th embodiment.

FIG. 11 is a schematic view of an imaging device according to the 6th embodiment of the present disclosure. FIG. 12 shows, in order from left to right, spherical aberration curves, astigmatic field curves and a distortion curve of the imaging device according to the 6th embodiment. In FIG. 11, the imaging device includes a photographing optical lens assembly (its reference numeral is omitted) and an image sensor 670. The photographing optical lens assembly includes, in order from an object side to an image side, a first lens element 610, an aperture stop 600, a second lens element 620, a third lens element 630, a fourth lens element 640, a filter 650 and an image surface 660, wherein the image sensor 670 is located at the image surface 660 of the photographing optical lens assembly. The photographing optical lens assembly has a total of four lens elements (610-640) with refractive power, and there is an air gap in a paraxial region between any two of the first lens element 610, the second lens element 620, the third lens element 630, and the fourth lens element 640 that are adjacent to each other.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric. Moreover, the object-side surface 621 of the second lens element 620 has at least one inflection point in an off-axis region thereof.

The third lens element 630 with positive refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The filter 650 is made of glass material and located between the fourth lens element 640 and the image surface 660, and will not affect a focal length of the photographing optical lens assembly.

The detailed optical data of the 6th embodiment are shown in Table 11 and the aspheric surface data are shown in Table 12 below.

TABLE 11

6th Embodiment
f = 4.62 mm, Fno = 2.45, HFOV = 14.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.217 | ASP | 0.823 | Plastic | 1.528 | 55.7 | 1.70 |
| 2 | | −2.589 | ASP | −0.094 | | | | |
| 3 | Ape. Stop | Plano | | 0.144 | | | | |
| 4 | Lens 2 | −4.044 | ASP | 0.230 | Plastic | 1.621 | 23.5 | −2.09 |
| 5 | | 1.952 | ASP | 1.567 | | | | |
| 6 | Lens 3 | −2.037 | ASP | 0.250 | Plastic | 1.621 | 23.5 | 11.37 |
| 7 | | −1.655 | ASP | 0.173 | | | | |
| 8 | Lens 4 | −1.179 | ASP | 0.300 | Plastic | 1.537 | 55.9 | −4.01 |
| 9 | | −2.835 | ASP | 0.300 | | | | |
| 10 | Filter | Plano | | 0.210 | Glass | 1.510 | 64.2 | — |
| 11 | | Plano | | 0.278 | | | | |
| 12 | Image | Plano | | — | | | | |

Note:
Reference wavelength is 820 nm
Effective radius of Surface 3 is 0.873 mm

TABLE 12

Aspheric Coefficients

| | Surface # | | | |
|---|---|---|---|---|
| | 1 | 2 | 4 | 5 |
| k = | −2.5682E+00 | −9.4488E+00 | −1.6957E+01 | 1.1619E+00 |
| A4 = | 1.5570E−01 | −1.1962E−02 | −1.1701E−02 | 6.6095E−02 |
| A6 = | 1.6252E−02 | 1.5258E−01 | 5.6359E−02 | −4.9373E−01 |
| A8 = | −2.1589E−01 | −1.5872E−01 | 1.4459E+00 | 5.5707E+00 |
| A10 = | 4.2254E−01 | −2.7911E−01 | −5.2508E+00 | −1.9470E+01 |
| A12 = | −3.6430E−01 | 4.6506E−01 | 7.1494E+00 | 3.2232E+01 |
| A14 = | 7.3040E−02 | −1.9160E−01 | −3.3942E+00 | −1.9570E+01 |

| | Surface # | | | |
|---|---|---|---|---|
| | 6 | 7 | 8 | 9 |
| k = | 3.2059E−01 | −1.8009E+01 | 8.5164E−03 | −1.1926E+00 |
| A4 = | −3.2273E−01 | −2.2646E−01 | 1.2738E+00 | 4.6532E−01 |
| A6 = | −2.1129E−01 | 1.1753E+00 | −1.5777E+00 | −7.4545E−01 |
| A8 = | 1.5820E+00 | −4.3243E+00 | 4.8502E−01 | 5.3366E−01 |
| A10 = | −6.9016E+00 | 6.1807E+00 | 8.6293E−01 | −2.0739E−01 |
| A12 = | 9.9166E+00 | −4.2357E+00 | −9.0078E−01 | 3.9000E−02 |
| A14 = | −4.2205E+00 | 1.2548E+00 | 2.8385E−01 | −2.3421E−03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f (mm) | 4.62 | |R4/R3| | 0.48 |
| Fno | 2.45 | f/R1 | 3.80 |
| HFOV [deg.] | 14.5 | R7/f | −0.26 |
| V2 + V3 | 47.00 | R8/f | −0.61 |
| CT2/CT3 | 0.92 | |f/f1| + |f/f2| | 4.93 |
| T23/(T12 + T34) | 7.03 | f/ImgH | 3.73 |
| T23/BFL | 2.19 | ImgH/EPD | 0.66 |
| f/(TD + BFL) | 1.13 | | |

7th Embodiment

Figure 13:
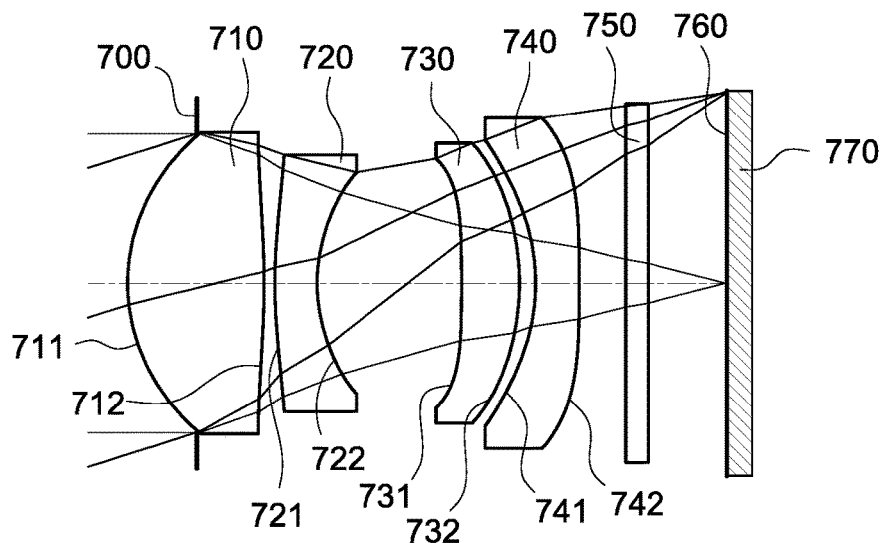
FIG. 13 is a schematic view of an imaging device according to the 7th embodiment of the present disclosure.
Figure 14:
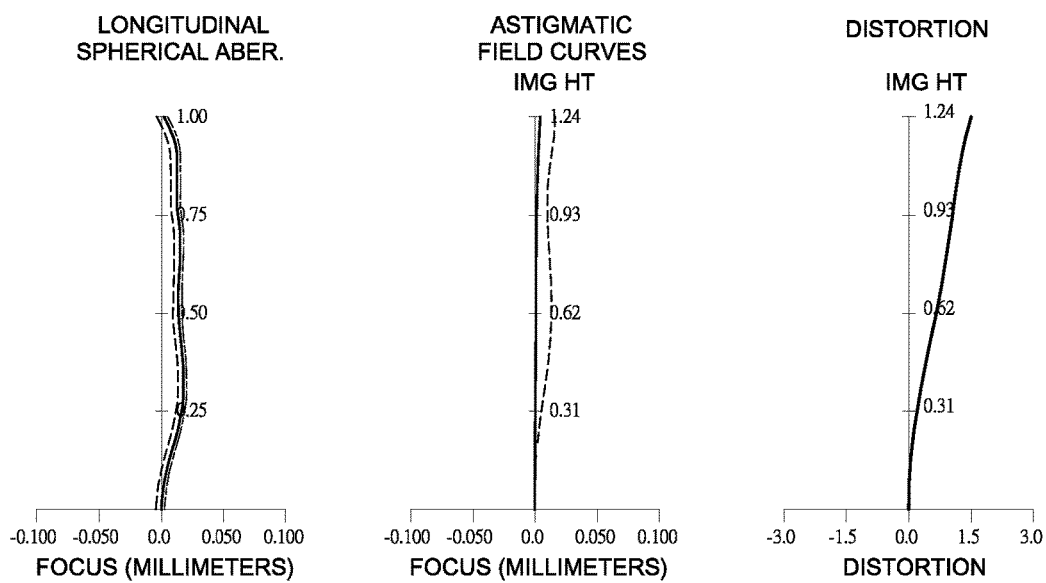
FIG. 14 shows, in order from left to right, spherical aberration curves, astigmatic field curves and a distortion curve of the imaging device according to the 7th embodiment.

FIG. 13 is a schematic view of an imaging device according to the 7th embodiment of the present disclosure. FIG. 14 shows, in order from left to right, spherical aberration curves, astigmatic field curves and a distortion curve of the imaging device according to the 7th embodiment. In FIG. 13, the imaging device includes a photographing optical lens assembly (its reference numeral is omitted) and an image sensor 770. The photographing optical lens assembly includes, in order from an object side to an image side, an aperture stop 700, a first lens element 710, a second lens element 720, a third lens element 730, a fourth lens element 740, a filter 750 and an image surface 760, wherein the image sensor 770 is located at the image surface 760 of the photographing optical lens assembly. The photographing optical lens assembly has a total of four lens elements (710-740) with refractive power, and there is an air gap in a paraxial region between any two of the first lens element 710, the second lens element 720, the third lens element 730, and the fourth lens element 740 that are adjacent to each other.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. Moreover, the object-side surface 721 of the second lens element 720 has at least one inflection point in an off-axis region thereof.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The filter 750 is made of glass material and located between the fourth lens element 740 and the image surface 760, and will not affect a focal length of the photographing optical lens assembly.

The detailed optical data of the 7th embodiment are shown in Table 13 and the aspheric surface data are shown in Table 14 below.

TABLE 13

7th Embodiment
f = 3.85 mm, Fno = 2.00, HFOV = 17.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.445 | | | | |
| 2 | Lens 1 | 1.205 | ASP | 0.877 | Plastic | 1.507 | 56.8 | 2.04 |
| 3 | | −5.550 | ASP | 0.069 | | | | |
| 4 | Lens 2 | 3.065 | ASP | 0.271 | Plastic | 1.615 | 23.4 | −2.59 |
| 5 | | 1.013 | ASP | 0.934 | | | | |
| 6 | Lens 3 | −11.641 | ASP | 0.372 | Plastic | 1.615 | 23.4 | 3.10 |
| 7 | | −1.660 | ASP | 0.103 | | | | |
| 8 | Lens 4 | −1.377 | ASP | 0.280 | Plastic | 1.507 | 56.8 | −2.85 |
| 9 | | −32.019 | ASP | 0.300 | | | | |
| 10 | Filter | Plano | | 0.145 | Glass | 1.510 | 64.2 | — |
| 11 | | Plano | | 0.509 | | | | |
| 12 | Image | Plano | | — | | | | |

Note:
Reference wavelength is 820 nm.

TABLE 14

Aspheric Coefficients

| Surface # | | | | |
|---|---|---|---|---|
| | 2 | 3 | 4 | 5 |
| k = | −2.5167E+00 | −2.2348E+01 | −4.6627E+01 | −1.8677E+00 |
| A4 = | 1.6200E−01 | 2.3265E−02 | −8.9051E−02 | −1.3686E−01 |
| A6 = | 2.0106E−02 | 2.0100E−01 | 2.6032E−01 | 3.5708E−01 |
| A8 = | −1.5659E−01 | −6.5813E−01 | −4.5243E−01 | 1.6225E+00 |
| A10 = | 3.1322E−01 | 1.1279E+00 | 3.9884E−01 | −8.2526E+00 |
| A12 = | −2.5240E−01 | −1.0198E+00 | −2.0985E−03 | 1.6497E+01 |
| A14 = | 7.8877E−02 | 3.6369E−01 | −2.1207E−01 | −1.1198E+01 |

| Surface # | | | | |
|---|---|---|---|---|
| | 6 | 7 | 8 | 9 |
| k = | 4.9572E+01 | 1.3239E+00 | 7.2677E−01 | 4.9609E+01 |
| A4 = | −2.5274E−01 | −1.1038E−01 | −7.2818E−02 | −1.6896E−01 |
| A6 = | 7.2733E−01 | 1.2840E+00 | 8.8289E−01 | −1.0380E−01 |
| A8 = | −3.8339E+00 | −5.1768E+00 | −3.5190E+00 | 3.2898E−01 |
| A10 = | 9.3446E+00 | 1.0467E+01 | 7.5895E+00 | −4.2827E−01 |
| A12 = | −1.3101E+01 | −1.0463E+01 | −7.2937E+00 | 2.9504E−01 |
| A14 = | 7.2815E+00 | 4.0852E+00 | 2.5757E+00 | −9.1568E−02 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f (mm) | 3.85 | \|R4/R3\| | 0.33 |
| Fno | 2.00 | f/R1 | 3.19 |
| HFOV [deg.] | 17.5 | R7/f | −0.36 |
| V2 + V3 | 46.80 | R8/f | −8.32 |
| CT2/CT3 | 0.73 | \|f/f1\| + \|f/f2\| | 3.37 |
| T23/(T12 + T34) | 5.43 | f/ImgH | 3.10 |

| 7th Embodiment | | | |
|---|---|---|---|
| T23/BFL | 1.03 | ImgH/EPD | 0.64 |
| f/(TD + BFL) | 1.01 | | |

8th Embodiment

Figure 15:
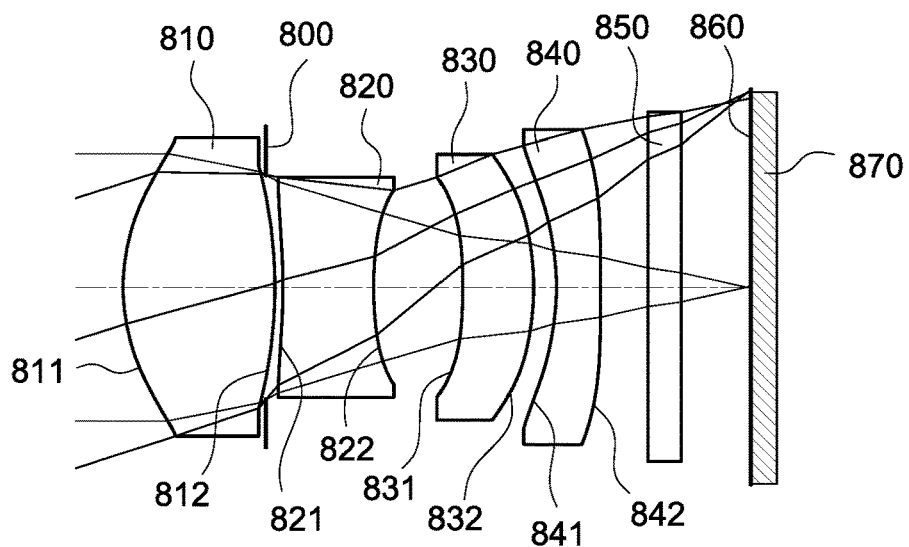
FIG. 15 is a schematic view of an imaging device according to the 8th embodiment of the present disclosure.
Figure 16:
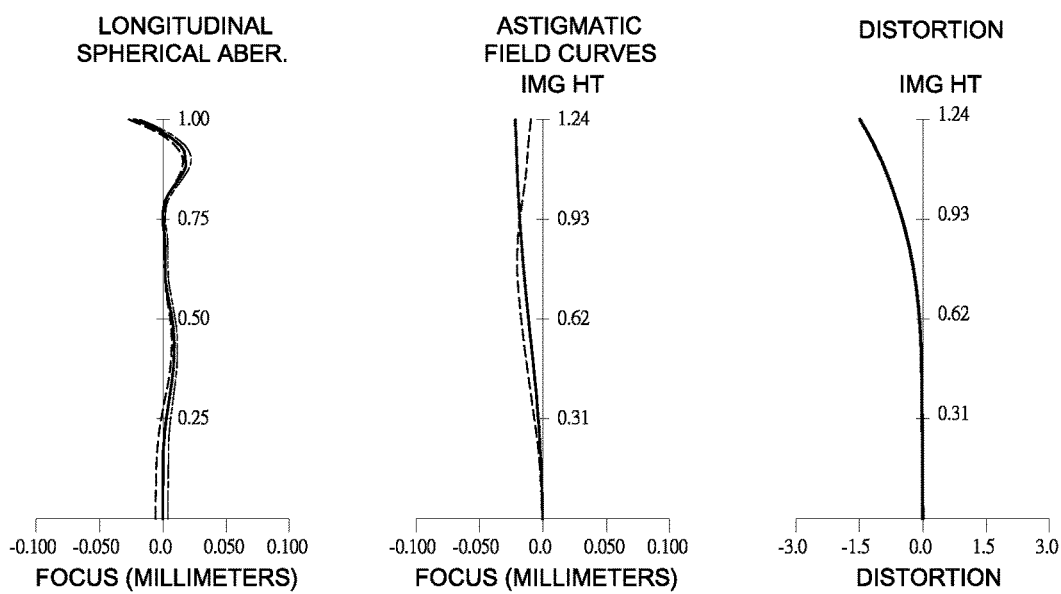
FIG. 16 shows, in order from left to right, spherical aberration curves, astigmatic field curves and a distortion curve of the imaging device according to the 8th embodiment.

FIG. 15 is a schematic view of an imaging device according to the 8th embodiment of the present disclosure. FIG. 16 shows, in order from left to right, spherical aberration curves, astigmatic field curves and a distortion curve of the imaging device according to the 8th embodiment. In FIG. 15, the imaging device includes a photographing optical lens assembly (its reference numeral is omitted) and an image sensor 880. The photographing optical lens assembly includes, in order from an object side to an image side, a first lens element 810, an aperture stop 800, a second lens element 820, a third lens element 830, a fourth lens element 840, a filter 850 and an image surface 860, wherein the image sensor 870 is located at the image surface 860 of the photographing optical lens assembly. The photographing optical lens assembly has a total of four lens elements (810-840) with refractive power, and there is an air gap in a paraxial region between any two of the first lens element 810, the second lens element 820, the third lens element 830, and the fourth lens element 840 that are adjacent to each other.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric. Moreover, the object-side surface 821 of the second lens element 820 has at least one inflection point in an off-axis region thereof.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The filter 850 is made of glass material and located between the fourth lens element 840 and the image surface 860, and will not affect a focal length of the photographing optical lens assembly.

The detailed optical data of the 8th embodiment are shown in Table 15 and the aspheric surface data are shown in Table 16 below.

TABLE 15

8th Embodiment
f = 3.90 mm, Fno = 2.30, HFOV = 17.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.271 | ASP | 0.963 | Plastic | 1.535 | 55.7 | 1.84 |
| 2 | | −3.217 | ASP | −0.058 | | | | |
| 3 | Ape. Stop | Plano | | 0.108 | | | | |
| 4 | Lens 2 | −4.805 | ASP | 0.575 | Plastic | 1.639 | 23.5 | −2.41 |
| 5 | | 2.373 | ASP | 0.562 | | | | |
| 6 | Lens 3 | −3.335 | ASP | 0.450 | Plastic | 1.639 | 23.5 | 4.94 |
| 7 | | −1.707 | ASP | 0.144 | | | | |
| 8 | Lens 4 | −1.531 | ASP | 0.280 | Plastic | 1.544 | 55.9 | −3.02 |
| 9 | | −24.253 | ASP | 0.300 | | | | |
| 10 | Filter | Plano | | 0.210 | Glass | 1.517 | 64.2 | — |
| 11 | | Plano | | 0.443 | | | | |
| 12 | Image | Plano | | — | | | | |

Note:
Reference wavelength is 587.6 nm (d-line).

TABLE 16

| | Surface # | | | |
|---|---|---|---|---|
| | 1 | 2 | 4 | 5 |
| k = | −3.6477E+00 | 8.9737E+00 | 1.8741E+01 | 1.2970E+00 |
| A4 = | 2.1476E−01 | −1.4846E−01 | −1.5241E−01 | 1.6074E−01 |
| A6 = | −3.8252E−01 | 1.2366E+00 | 2.3950E+00 | −2.7328E−01 |
| A8 = | 1.1206E+00 | −4.6978E+00 | −1.2180E+01 | 6.2536E+00 |
| A10 = | −2.2628E+00 | 1.0277E+01 | 3.6202E+01 | −3.2013E+01 |
| A12 = | 2.2325E+00 | −1.1457E+01 | −5.4468E+01 | 8.5172E+01 |
| A14 = | −8.8159E−01 | 4.9083E+00 | 3.2021E+01 | −8.2056E+01 |

| | Surface # | | | |
|---|---|---|---|---|
| | 6 | 7 | 8 | 9 |
| k = | 1.0024E+00 | −4.7011E+00 | 2.9984E−01 | 2.0539E+00 |
| A4 = | −2.1697E−01 | 7.6612E−02 | 4.4889E−01 | −3.9183E−02 |
| A6 = | −7.2383E−01 | −1.4738E+00 | −2.0383E+00 | −3.6964E−01 |
| A8 = | 1.7359E+00 | 3.9842E+00 | 5.6654E+00 | 8.6227E−01 |
| A10 = | −2.2920E+00 | −6.0518E+00 | −8.5144E+00 | −1.0082E+00 |
| A12 = | −2.8790E+00 | 4.5244E+00 | 6.7475E+00 | 5.8735E−01 |
| A14 = | 8.1971E+00 | −1.0852E+00 | −2.1461E+00 | −1.3194E−01 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f (mm) | 3.90 | |R4/R3| | 0.49 |
| Fno | 2.30 | f/R1 | 3.07 |
| HFOV [deg.] | 17.8 | R7/f | −0.39 |
| V2 + V3 | 47.00 | R8/f | −6.22 |
| CT2/CT3 | 1.28 | |f/f1| + |f/f2| | 3.74 |
| T23/(T12 + T34) | 2.90 | f/ImgH | 3.15 |
| T23/BFL | 0.64 | ImgH/EPD | 0.73 |
| f/(TD + BFL) | 1.00 | | |

9th Embodiment

Figure 17:
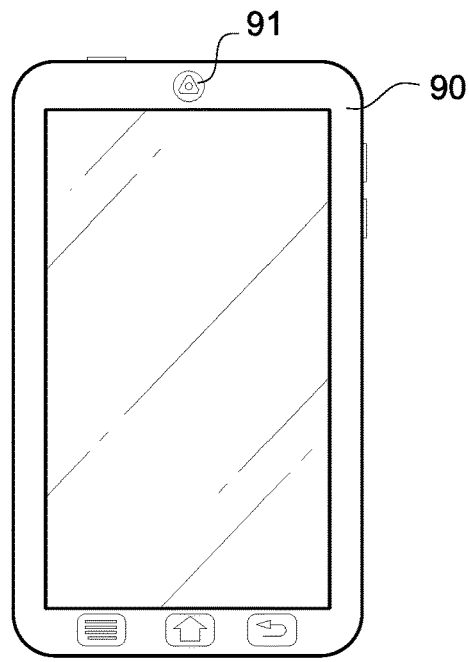
FIG. 17 is a schematic view of an electronic device according to the 9th embodiment of the present disclosure.

FIG. 17 is a schematic view of an electronic device 90 according to the 9th embodiment of the present disclosure. The electronic device 90 of the 9th embodiment is a smart phone, wherein the electronic device 90 includes an imaging device 91. The imaging device 91 includes a photographing optical lens assembly (not otherwise herein labeled) according to the present disclosure and an image sensor (not otherwise herein labeled), wherein the image sensor is located at an image side of the photographing optical lens assembly.

10th Embodiment

Figure 18:
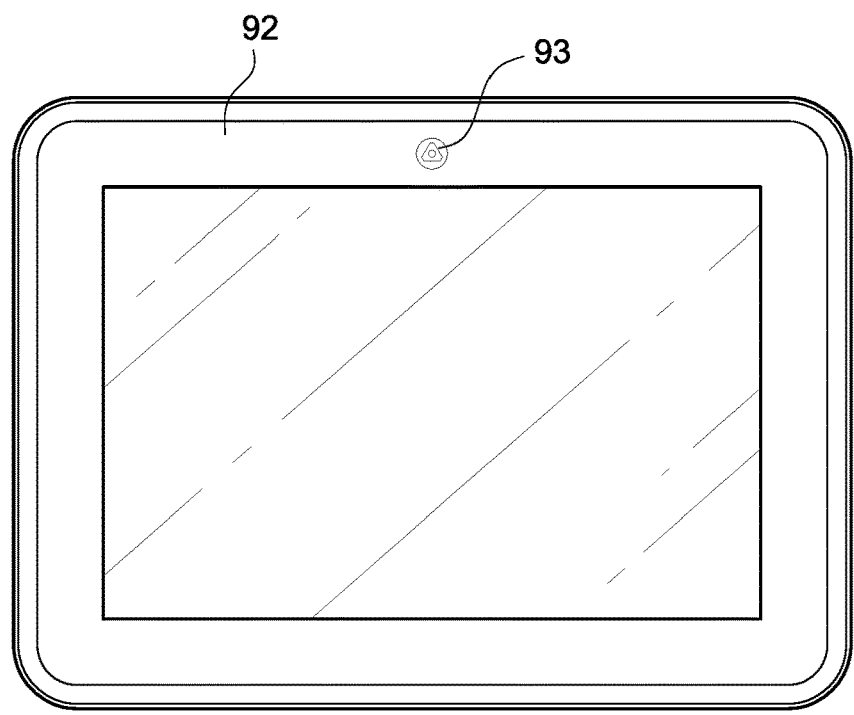
FIG. 18 is a schematic view of an electronic device according to the 10th embodiment of the present disclosure.

FIG. 18 is a schematic view of an electronic device 92 according to the 10th embodiment of the present disclosure. The electronic device 92 of the 10th embodiment is a tablet personal computer, wherein the electronic device 92 includes an imaging device 93. The imaging device 93 includes a photographing optical lens assembly (not otherwise herein labeled) according to the present disclosure and an image sensor (not otherwise herein labeled), wherein the image sensor is located at an image side of the photographing optical lens assembly.

11th Embodiment

Figure 19:
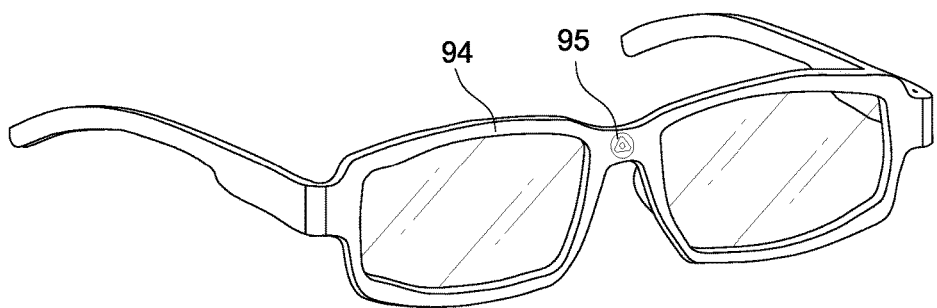
FIG. 19 is a schematic view of an electronic device according to the 11th embodiment of the present disclosure.

FIG. 19 is a schematic view of an electronic device 94 according to the 11th embodiment of the present disclosure. The electronic device 94 of the 11th embodiment is a head-mounted display (HMD), wherein the electronic device 94 includes an imaging device 95. The imaging device 95 includes a photographing optical lens assembly (not otherwise herein labeled) according to the present disclosure and an image sensor (not otherwise herein labeled), wherein the image sensor is located at an image side of the photographing optical lens assembly.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly, comprising four lens elements, the four lens elements being, in order from an object side to an image side:
a first lens element with positive refractive power having an object-side surface being convex in a paraxial region thereof;
a second lens element having negative refractive power;
a third lens element having an object-side surface being concave in a paraxial region thereof; and
a fourth lens element with negative refractive power having an object-side surface being concave in a paraxial region and an image-side surface being convex in a paraxial region thereof;
wherein there is an air gap in a paraxial region between any two of the first lens element, the second lens element, the third lens element, and the fourth lens element that are adjacent to each other, an axial distance between the first lens element and the second lens element is T12, an axial distance between the second lens element and the third lens element is T23, an axial distance between the third lens element and the fourth lens element is T34, a focal length of the photographing optical assembly is f, a curvature radius of the object-side surface of the first lens element is R1, an Abbe number of the second lens element is V2, an Abbe number of the third lens element is V3, and the following conditions are satisfied:

$$1.75 < T23/(T12+T34);$$

$$3.0 < f/R1 < 4.5; \text{ and}$$

$$V2+V3 < 55.$$

2. The photographing optical lens assembly of claim 1, wherein the image-side surface of the third lens element is convex in a paraxial region.

3. The photographing optical lens assembly of claim 2, wherein the Abbe number of the second lens element is V2, the Abbe number of the third lens element is V3, and the following condition is satisfied:

$$V2+V3 \leq 47.0.$$

4. The photographing optical lens assembly of claim 2, wherein the focal length of the photographing optical assembly is f, a maximum image height of the photographing optical lens assembly is ImgH, and the following condition is satisfied:

$$2.25 < f/ImgH < 5.0.$$

5. The photographing optical lens assembly of claim 2, wherein the third lens element has positive refractive power.

6. The photographing optical lens assembly of claim 1, wherein the axial distance between the first lens element and the second lens element is T12, the axial distance between the second lens element and the third lens element is T23, the axial distance between the third lens element and the fourth lens element is T34, and the following condition is satisfied:

$2.5 < T23/(T12+T34)$.

7. The photographing optical lens assembly of claim 1, wherein an object-side surface of the second lens element has at least one inflection point in an off-axis region thereof.

8. The photographing optical lens assembly of claim 1, wherein a curvature radius of the object-side surface of the fourth lens element is R7, the focal length of the photographing optical lens assembly is f, and the following condition is satisfied:

$-0.40 < R7/f < -0.15$.

9. The photographing optical lens assembly of claim 1, wherein a maximum image height of the photographing optical lens assembly is ImgH, an entrance pupil diameter of the photographing optical lens assembly is EPD, and the following condition is satisfied:

$ImgH/EPD < 1.0$.

10. The photographing optical lens assembly of claim 1, wherein a curvature radius of an object-side surface of the second lens element is R3, a curvature radius of an image-side surface of the second surface is R4, and the following condition is satisfied:

$|R4/R3| < 0.50$.

11. The photographing optical lens assembly of claim 1, wherein a central thickness of the second lens element is CT2, a central thickness of the third lens element is CT3, and the following condition is satisfied:

$0.8 < CT2/CT3 < 1.5$.

12. The photographing optical lens assembly of claim 1, wherein the axial distance between the second lens element and the third element is T23, an axial distance between the image-side surface of the fourth lens element and an image surface is BFL, and the following condition is satisfied:

$1.5 < T23/BFL < 3.0$.

13. The photographing optical lens assembly of claim 1, wherein the focal length of the photographing optical lens assembly is f, a maximum image height of the photographing optical lens assembly is ImgH, and the following condition is satisfied:

$2.75 < f/ImgH < 5.0$.

14. The photographing optical lens assembly of claim 1, wherein the focal length of the photographing optical lens assembly is f, a focal length of the first lens element is f1, a focal length of the second lens element is f2, and following the condition is satisfied:

$3.0 < |f/f1| + |f/f2|$.

15. The photographing optical lens assembly of claim 1, wherein the focal length of the photographing optical lens assembly is f, an axial distance between the object-side surface of the first lens element and the image-side surface of the fourth lens element is TD, an axial distance between the image-side surface of the fourth lens element and an image surface is BFL, and the following condition is satisfied:

$0.90 < f/(TD+BFL) < 1.25$.

16. The photographing optical lens assembly of claim 1, wherein a curvature radius of an image-side of the fourth lens element is R8, the focal length of the photographing optical lens assembly is f, and the following condition is satisfied:

$R8/f < -0.5$.

17. The photographing optical lens assembly of claim 1, further comprising an aperture stop disposed between an imaged object and the second lens element.

18. The photographing optical lens assembly of claim 1, wherein the photographing optical lens assembly is applicable for infrared wavelength ranging from 750 nm to 1050 nm.

19. An imaging device, comprising:
the photographing optical lens assembly of claim 1; and
an image sensor, wherein the image sensor is located at the image side of the photographing optical lens assembly.

20. An electronic device, comprising:
the imaging device of claim 19.

* * * * *